Figure 1:
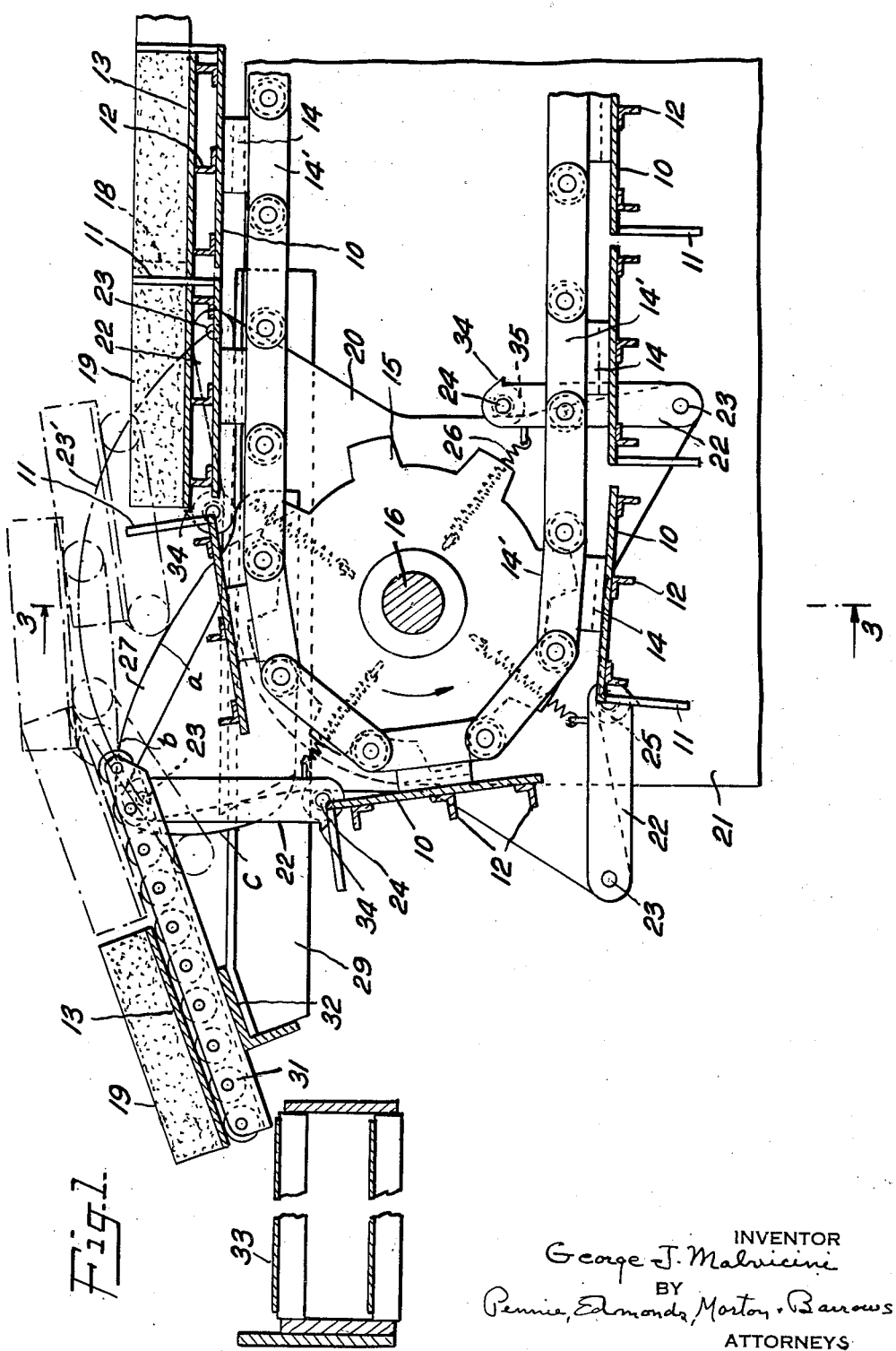

March 21, 1950 G. J. MALVICINI 2,501,473
ARTICLE TRANSFER MECHANISM FOR PALLET-CONVEYERS
Filed May 14, 1947 3 Sheets-Sheet 1

INVENTOR
George J. Malvicini
BY
Pennie, Edmonds, Morton & Barrows
ATTORNEYS

March 21, 1950  G. J. MALVICINI  2,501,473
ARTICLE TRANSFER MECHANISM FOR PALLET-CONVEYERS
Filed May 14, 1947  3 Sheets-Sheet 2

INVENTOR
George J. Malvicini
BY
Pennie, Edmonds, Morton · Barrows
ATTORNEYS

March 21, 1950     G. J. MALVICINI     2,501,473
ARTICLE TRANSFER MECHANISM FOR PALLET-CONVEYERS
Filed May 14, 1947     3 Sheets-Sheet 3

INVENTOR
George J. Malvicini
BY
Pennie, Edmonds, Morton & Barrows
ATTORNEYS

{ Patented Mar. 21, 1950

2,501,473

UNITED STATES PATENT OFFICE 2,501,473

ARTICLE TRANSFER MECHANISM FOR PALLET CONVEYERS

George J. Malvicini, Newark, N. J., assignor to Brickmaster, Inc., New York, N. Y., a corporation of New York Application May 14, 1947, Serial No. 747,932

14 Claims. (Cl. 198—27)

This invention relates to brick-making machines and more particularly to machines of the type described in Dietrichs United States Letters Patent No. 1,782,413, patented November 25, 1930. The invention aims to provide certain improvements in brick-making machines of this type, and more particularly to provide means for automatically removing the brick-supporting pallets from the discharge end of such a machine.

The brick-making machine to which the invention relates has a pallet-conveyor for continuously carrying brick-supporting pallets through various brick-making operations to the pallet-discharge end of the machine. In accordance with the invention, in its broad aspect, a rotatable member moving in synchronism with the conveyor is adapted to move an arm operatively mounted on the member into pallet-removing engagement with the pallet to be discharged from the conveyor. A cam positioned in the operative path of movement of the arm then cooperates with the rotating member to actuate the arm to remove the pallet from the conveyor. Preferably, two spaced rotatable members are provided, each with a correspondingly mounted arm, and the two arms engage opposite ends of the pallet and cooperate in removing it from the conveyor. Each pallet-removing arm may advantageously be pivoted at one end to its rotatable member with its other free end in a forward position. The free end of each arm is normally biased, as for example by a spring, inwardly toward the axis of the member. As the member continues to rotate, after the arm is moved to its pallet-removing engagement with the pallet to be discharged from the conveyor, the cam and rotating member are adapted to actuate the arm to remove that pallet from the conveyor and transfer it to a suitable pallet-receiving means, such as a transfer conveyor or the like.

In its preferred form the pallet-conveyor comprises an endless link chain (or chains) with pallet-holders secured to the alternate links of the chain. The chain is driven by a sprocket having an even number of teeth. Two spaced rotatable members, advantageously discs, and the sprocket are secured to a common drive shaft. A plurality (half the number of teeth on the sprocket) of cooperating pairs of arms are mounted on the members in spaced relation, the cooperating pairs of arms being adapted to be moved successively into pallet-lifting positions beneath the next pallet to be discharged from the conveyor. Two cams, positioned respectively in the operative paths of movement of the two arms of each cooperating pair, cooperate with the rotating members to actuate each cooperating pair of arms to lift a pallet off the conveyor as the pairs of arms move successively to their pallet-lifting positions.

In a preferred form of the invention, the chain driving sprocket may advantageously have eight teeth. With the pallet-holders secured to alternate links of the chain, each revolution of the sprocket moves four pallets successively into pallet-discharging position. Two rotatable discs (secured to the sprocket drive shaft) are positioned underneath the opposite ends of the pallet to be discharged, but clearing the pallet-conveyor. On each disc are four pallet-lifting arms which pivot from four equally spaced points on the disc. The other free ends of these arms are adapted to ride over a cam which lifts the pivoted arm vertically, while the arm itself moves in an arc, thus lifting the pallet off the conveyor while keeping ahead of the following pallet-holder, which is necessary because the movement of the conveyor is continuous. The arms are then cammed to set the pallet down on a short conveyor which is clear of the continuous chain of the pallet-conveyor. The short conveyor is slightly inclined, allowing the pallets, carrying the bricks, to slide down to a waiting conveyor. The arms are then drawn back by their respective springs, preparatory to operating again when they next reach their pallet-lifting positions. This operation is repeated by each of the four cooperating pairs of arms, each pair, in turn, lifting a pallet off the conveyor. Since the four pairs of arms are tied to four equally spaced pivot points on their respective discs, four pallets are lifted off the conveyor with each revolution of the sprocket and discs.

Figure 2:
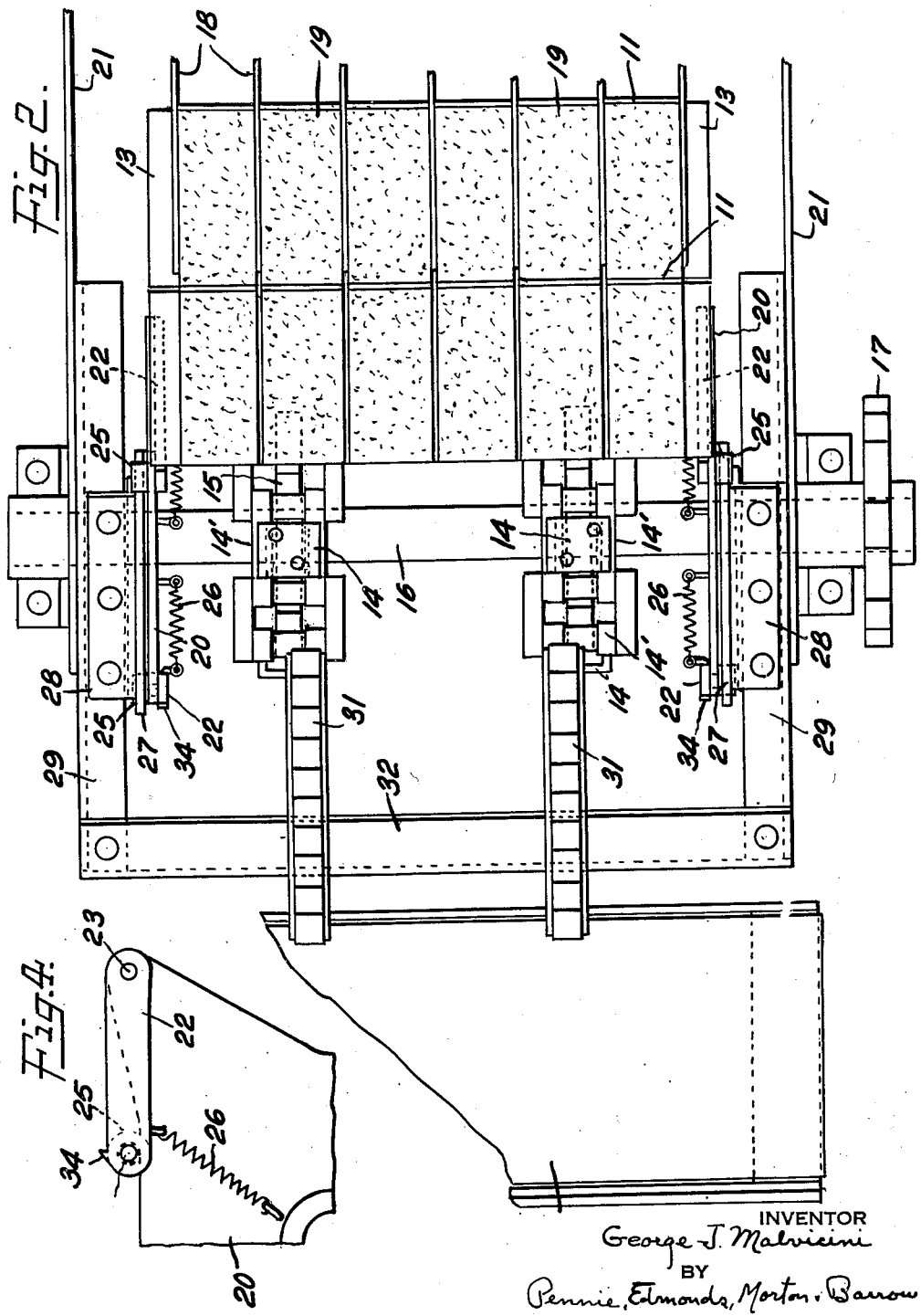
Figure 3:
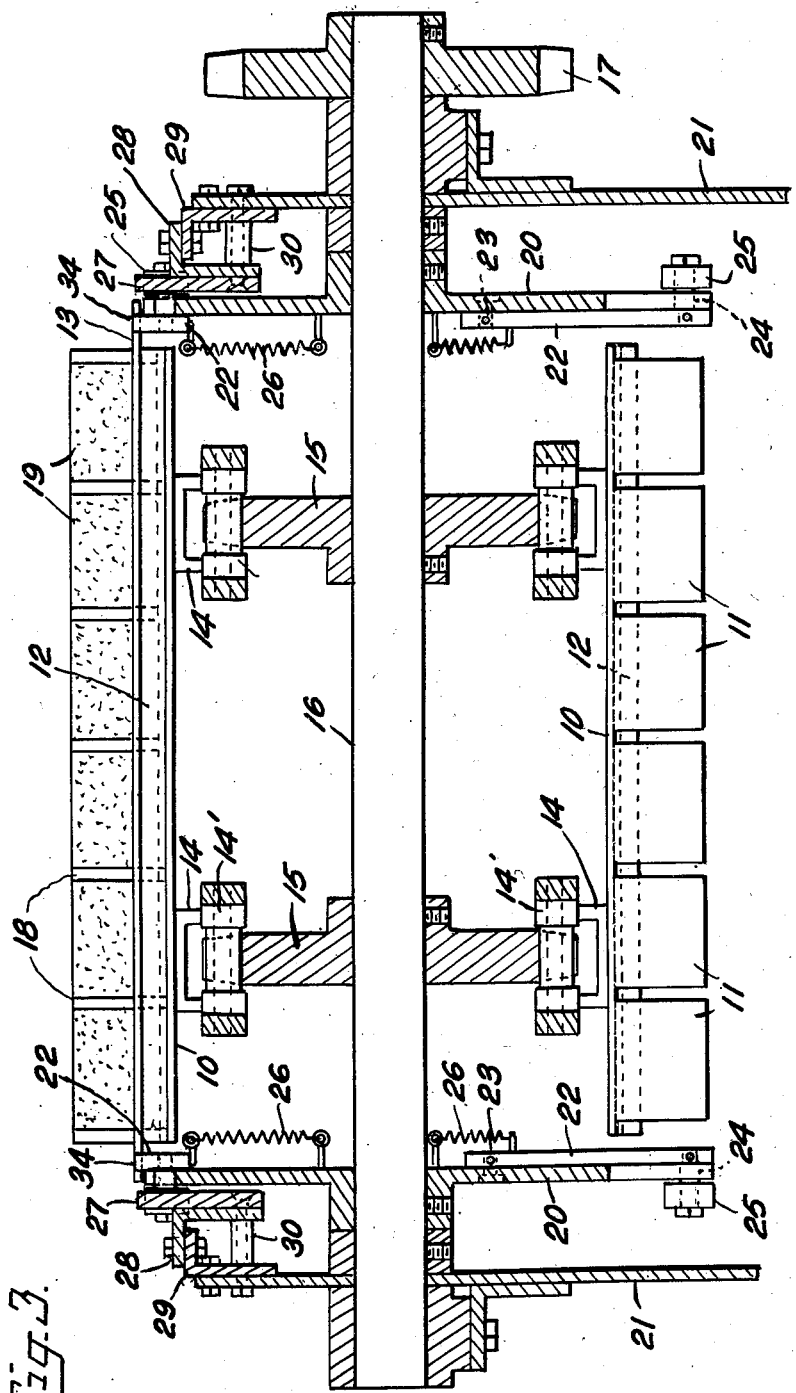

The foregoing and other novel features of the invention will be best understood from the following description taken in conjunction with the accompanying drawings, in which Fig. 1 is an elevation, partly in section, of the improvement of the invention applied to the discharge end of a brick-making machine, Fig. 2 is a top plan of the apparatus of Fig. 1, Fig. 3 is a sectional elevation on the section line 3—3 of Fig. 1, and Fig. 4 is a detail view of the mounting of a pallet-lifting arm on its rotatable member.

The drawings illustrate the discharge end of a brick-making machine of the type described in the United States patent of Dietrichs No. 1,782,413. This machine operates continuously to produce molded bricks. The machine has a plurality of pallet-holders or carriers 10 having upstanding backs 11 and spaced supports 12 secured to the upper surface thereof, for supporting removable pallets 13 as they progress through the successive operating stages of the machine. The pallets are slightly wider than their holders and hence extend a short distance beyond the side edges of the holders (Fig. 3). The pallet-holders 10 are secured to two endless bronze link chains 14. Each chain 14 operatively engages a pair of sprockets 15 positioned at the opposite ends of the machine. The chains are positioned, in suitably spaced relation, intermediate the sides of the pallet-holders and beneath the advancing pallet-holders with their loads of molded brick and above the returning empty pallet-holders (Fig. 3).

The pallet-holders correspond in length to two links of the chain and successive holders are secured to alternate links 14' of the chain. Each of the sprockets 15 has 8 teeth and hence with each revolution of the sprockets the chain moves through the length of 4 pallet-holders. Since only the discharge end of the machine is illustrated in the drawings, only the rear or discharge end sprockets are shown. These sprockets are keyed to a rotatably mounted shaft 16 adapted to be driven by a gear 17 (at one end thereof) from the main power source of the machine.

The endless chains and pallet-holders secured thereto constitute a pallet conveyor. As each pallet-holder passes around the forward sprockets into a horizontal position, a pallet 13 is placed on the spaced supports 12 of the holder. When the pallet-holders arrive in the horizontal position adjacent one another, the distance between the upstanding backs 11 is that corresponding to the length of the brick to be made and the vertical distance from the upper surface of the pallet to the top of the backs 11 corresponds to the width of the brick.

Each pallet holder has a plurality of backs 11 corresponding to the number of bricks to be molded per pallet (Fig. 3). The backs 11 are fastened to the rear edge of the holder in slightly spaced relation from one another, and longitudinal slicer or spacer bars 18 extend through the spaces between the backs from near the forward end of the machine to near the discharge end, the bars 18 dividing the pallets lengthwise into subdivisions corresponding to the thickness of the bricks. The continuously moving conveyor carries the pallets through the successive operations of brick-making as described in the aforementioned Dietrichs patent, and delivers the completely molded bricks 19 to the discharge end of the machine. The machine illustrated in the drawings is designed to make six bricks on each pallet, but this number may be more or less.

In the operation of the brick making machine, it has heretofore been necessary to have a helper stationed at the discharge end of the machine to remove each pallet of bricks before its holder descended downwardly over the rear sprockets. In accordance with the improvement of the present invention, the pallets (and brick load thereon) are automatically transferred from the discharge end of the machine to a conveyor system that automatically transports them to a place of storage or the like.

A steel disc 20 is locked to the shaft 16 at a point between each rear sprocket 15 and the adjacent side plate 21 of the machine. The distance between the two discs 20 corresponds approximately with the width of the pallets 13 but is slightly greater than the width of the pallet-holders 10, so that the discs are positioned beneath the opposite ends of the pallet, but clearing the pallet-holders. The discs 20 are generally star-shaped with 4 uniform points. A pallet-lifting arm 22 is pivotally mounted at each of the four points of the disc. Thus, an arm 22 is pivoted at 23 to each of the 4 points of the disc and extends forwardly in the general direction of rotation of the disc. A short shaft 24 is secured to the other free end of each arm 22 and extends outwardly across the peripheral edge of the disc. A roller 25 is mounted (preferably with ball bearings) on the outside end of the shaft, whereby the disc 20 is between the arm 22 and the roller 25, and the shaft 24 may contact the peripheral edge of the disc. A spring 26 is secured in a generally radial position between the free end of the arm 22 and a point near the center of the disc and biases the arm inwardly with the shaft contacting and held against the peripheral edge of the disc by the tension of the spring.

A cam 27 is mounted on each side plate 21 of the machine with its operative cam surface in the path of movement of the advancing roller 25. The cam is bolted to a bracket 28 which is bolted to another and longer bracket 29 bolted to the side plate 21. To prevent buckling of the cam mountings due to excess pressure on the cams as the rollers 25 ride thereover, spacers 30 may be secured to the side plates 21 between the depending legs of the brackets 28 and 29.

Figure 1 of the drawings shows the relative positions of the parts of the machine at the instant that a cooperating pair of arms 22 on the two discs 20 have risen to a horizontal position directly beneath the ends of the next advancing pallet to be discharged from the machine. As the conveyor advances this pallet, the rollers 25 engage and ride up the cams 27 thus elevating the free ends of the pivoted arms 22. At the same time the pivots 23 of the arms 22 are correspondingly elevated by the upwardly rising points of the discs 20 to which these arms are pivoted. The operative template (a, b and c) of the cams 27 is so correlated with the shape of the discs 20 that the pallet and its load of bricks is lifted off the conveyor and, while being maintained in a substantially horizontal position, is transferred to a short roller conveyor 31. Three successive positions of the pallet are indicated in dotted lines on Figure 1 of the drawings. Preferably, the pivoted ends of the arms 22 are elevated by the discs 20 at a slightly faster rate than the cams 27 elevate the free ends of the arms, so that the arms have a slight forward inclination until the pallet engages the first rollers of two short conveyors 31.

The two spaced roller conveyors 31 are adapted to securely support the pallets while moving thereover by gravity. The conveyors 31 are mounted on a cross plate 32 bolted to the extending ends of the long brackets 29. The conveyors 31 are downwardly inclined, so that when the pivots 23 of the arms 22 reach their uppermost positions, the pallet rests on the rollers of the two spaced conveyors and moves by gravity over these conveyors onto a transverse horizontal conveyor 33, which transfers the pallets to a place of storage or the like. As the pivots 23 approach their uppermost positions, the rollers 25 at the free ends of the pallet-supporting arms 22 ride off the upwardly inclined long portion a of the cams 20 onto the succeeding generally horizontal short portion b and then onto the relatively steeply downwardly inclined portion c. As the rollers pass over the horizontal portion b of the cams, the springs 26 retract the free ends of the arms, thus lowering and disengaging the holding projection 34 from its operative engagement with the advancing edge of the pallet. Up until this stage, projections 34 prevent the pallet from moving forwardly on the arms 22, particularly as the pallet assumes a slightly inclined position as it is elevated from the pallet conveyor to the roller conveyors 31. As the rollers ride onto and over the downwardly inclined portion c of the cams 20, the arms 22 are retracted by the springs 26 to their normal biased positions with the shafts 24 contacting and held against the peripheral edges of their respective discs 20.

While the sprockets 15 are shown as having eight teeth, they may have any suitable even number of teeth. The number of spaced pallet-lifting arms on each disc will be half the number of teeth on the sprocket. With each revolution of the sprockets and discs, the number of pallets discharged from the machine will be the number of pallet-lifting arms on each disc. The sprockets and discs are appropriately keyed or locked on the drive shaft 16 to time the arrival of the successive pairs of cooperating pallet-lifting arms beneath the next pallet to be discharged at the proper succeeding intervals. The configuration of the generally star-shaped discs 20 is such that the pallet-lifting arms 22 occupy a substantially horizontal position beneath the pallet to be discharged at the start of the pallet-lifting operation. With one end of the arm pivoted to each star point of the disc and the other free end of the arm directed forwardly (i. e. in the direction of rotation), the normal inward bias of the arm is such that the pivoted and free ends of the arms travel respectively in outer and inner concentric circular paths with the radial distance or space between the paths about half the length of the arm. Having arrived at their substantially horizontal pallet-lifting positions, the opposite ends of each of the two cooperating arms are elevated at substantially the same rate as the free ends ride over the upwardly inclined long portion a of the cams 27 and the pivoted ends travel upwardly in the circular path indicated by the dot and dash line 23' of Figure 1. As the pivoted ends of the arms approach their uppermost positions, the free ends, now riding over the substantially horizontal short portion b of the cams, begin to be retracted by their springs, and the pallet is easily transferred to the conveyors 31. As the free ends of the arms next ride over the steeply downwardly inclined portion c of the cams 27, the arms are retracted to their normal biased positions, and the succeeding cooperating pair of arms is brought into lifting-position beneath the next pallet to be discharged from the conveyor. In this manner the pallets are automatically discharged and transferred in sequence without interrupting the continuous operation of the machine.

I claim:

1. In a brick-making machine in which a pallet-conveyor continuously carries removable brick-supporting pallets through various brick-making operations to the pallet-discharge end of the machine, the improvement which comprises a rotatable member moving in synchronism with the conveyor, an arm mounted on said member and adapted to be moved by the member into a pallet-lifting position beneath the pallet to be discharged from the conveyor, one end of said arm being pivoted to the rotatable member with its other free end in a forward position and normally biased inwardly toward the axis of the member, a cam positioned in the operative path of movement of the free end of said arm, and means for receiving pallets discharged from said machine, said cam and said member being adapted as the member continues to rotate after said arm reaches its pallet-lifting position to move said arm upwardly and thereby lift the pallet off said conveyor and transfer it to said pallet-receiving means.

2. In a brick-making machine in which a pallet-conveyor continuously carries removable brick-supporting pallets through various brick-making operations to the pallet-discharge end of the machine, the improvement which comprises a rotatable member moving in synchronism with the conveyor, an arm mounted on said member and adapted to be moved by the member into pallet-removing engagement with the pallet to be discharged from the conveyor, one end of said arm being pivoted to the rotatable member with its other free end in a forward position, a roller mounted on the free end of said arm, a spring normally biasing the free end of said arm inwardly toward the axis of the rotating member, a cam positioned in the path of movement of said roller, and means for receiving pallets discharged from said machine, said cam and said member being adapted as the member continues to rotate after said arm reaches its pallet-removing engagement with the pallet to be discharged to move said arm upwardly and thereby lift that pallet off said conveyor and onto said pallet-receiving means.

3. In a brick-making machine in which a pallet-conveyor continuously carries removable brick-supporting pallets through various brick-making operations to the pallet-discharge end of the machine, the improvement which comprises a pair of spaced rotatable members moving in synchronism with the conveyor, an arm operatively mounted on each member, said arms being adapted to be simultaneously moved by their respective members into cooperative pallet-lifting positions beneath the pallet to be discharged from the conveyor, each of said arms being pivoted at one end to its respective member with its other free end in a forward position and normally biased inwardly toward the axis of the member, a cam positioned in the operative path of movement of the free end of each arm, and means for receiving pallets discharged from said machine, said cams and said members being adapted as said members continue to rotate after said arms reach their cooperative pallet-lifting positions to move the arms upwardly and thereby lift the pallet off said conveyor and transfer it to said pallet-receiving means.

4. In a brick-making machine in which a pallet-conveyor continuously carries removable brick-supporting pallets through various brick-making operations to the pallet-discharge end of the machine, the improvement which comprises a rotatable member moving in synchronism with the conveyor, a plurality of arms mounted in circumferentially spaced relation on said member and adapted to be successively moved by the member into pallet-removing engagement with the next pallet to be discharged from the conveyor, and a cam positioned in the operative path of movement of said arms, said cam and said member being adapted by the rotation of the member to actuate said arms to remove a pallet from the conveyor as each arm moves to its pallet-removing engagement with the next pallet to be discharged.

5. In a brick-making machine in which a pallet-conveyor continuously carries removable brick-supporting pallets through various brick-making operations to the pallet-discharge end of the machine, the improvement which comprises a pair of spaced rotatable members moving in synchonism with the conveyor, a plurality of cooperating pairs of arms mounted in circumferentially spaced relation on said members and adapted to be successively moved by the rotation of the members into cooperative pallet-removing engagement with the next pallet to be discharged from the conveyor, a cam positioned in the operative path of movement of each arm of each pair and adapted upon the pallet-removing engagement of a pair of arms therewith to cooperate with that pair of arms and the rotating members to lift the pallet to be discharged off the conveyor and transfer it to a pallet-receiving means.

6. In a brick-making machine in which a pallet-conveyor continuously carries removable brick-supporting pallets through various brick-making operations to the pallet-discharge end of the machine, the improvement which comprises a pair of spaced rotatable discs, moving in synchronism with the conveyor, a plurality of cooperating pairs of arms mounted on said discs in circumferentially spaced relation around the discs, the cooperating pairs of arms being adapted to be moved successively by the rotating discs into pallet-lifting positions beneath the next pallet to be discharged from the conveyor, a pair of spaced cams positioned respectively in the operative paths of movement of the two arms of each cooperating pair, and means for receiving pallets discharged from the machine, said cams and discs being adapted by the rotation of the discs to actuate each cooperating pair of arms to lift a pallet off the conveyor and transfer it to said pallet-receiving means as the pairs of arms move successively to their pallet-lifting positions.

7. The improvement in a brick-making machine according to claim 6, further characterized in that one end of each arm is pivoted to its rotatable disc with its other free end in a forward position and normally biased inwardly toward the axis of the disc, and the paths of movement of the pivoted and free ends of the arm are respectively outer and inner concentric circles radially spaced apart by about half the length of the arm.

8. The improvement in a brick-making machine according to claim 6, further characterized in that the pallet-conveyor comprises an endless link chain with pallet holders secured to alternate links of the chain, the chain is driven by a sprocket having an even number of teeth, the sprocket and discs are secured to a common drive shaft, and the number of cooperating pairs of arms mounted on the discs is half the number of teeth on the sprocket.

9. In a brick-making machine in which a pallet-conveyor continuously carries removable brick-supporting pallets through various brick-making operations to the pallet-discharge end of the machine, the improvement which comprises a pair of spaced rotatable discs moving in synchronism with the conveyor, a plurality of cooperating pairs of arms mounted on said discs in spaced relation around the discs, each of said arms being pivoted at one end to its disc with its other free end in a forward position, a roller mounted on the free end of each arm, a spring associated with each arm and normally biasing the arm inwardly toward the axis of the disc, the cooperating pairs of arms being adapted to be moved successively by the rotating discs into pallet-lifting positions beneath the next pallet to be discharged from the conveyor, a pair of spaced cams positioned respectively in the operative paths of movement of the rollers on the two arms of each cooperating pair, and means for receiving pallets discharged from the machine, said cams and discs being adapted by the rotation of the discs to actuate each cooperating pair of arms to lift a pallet off the conveyor and transfer it to said pallet-receiving means as the pairs of arms move successively to their pallet-lifting positions.

10. The improvement in a brick-making machine according to claim 9 further characterized in that the paths of movement of the pivoted and free ends of the arms on each disc are respectively outer and inner concentric circles radially spaced apart by about half the length of the arm.

11. The improvement in a brick-making machine according to claim 10 further characterized in that the template of each cam has three general operative portions viz.: (1) an upwardly inclined long portion merging into (2) a generally horizontal short portion merging into (3) a relatively steep downwardly inclined portion.

12. The improvement in a brick-making machine according to claim 11 further characterized in that the pallet-conveyor comprises an endless link chain with pallet-holders secured to alternate links of the chain, the chain is driven by a sprocket having an even number of teeth, the sprocket and discs are secured to a common drive shaft, and the number of cooperating pairs of arms mounted on the discs is half the number of teeth on the sprocket.

13. The improvement in a brick-making machine according to claim 12 further characterized in that the discs have a generally star-shaped configuration with the number of star points corresponding to the number of cooperating arms, one arm being pivoted approximate each star point with the free end of the arm extending forwardly with respect to the direction of rotation of the discs.

14. The improvement in a brick-making machine according to claim 13 further characterized in that the template of the cams and the configuration of the rotatable discs are coordinated to correspondingly elevate both ends of the arms whereby the pallets are maintained in a substantially horizontal position as they are lifted vertically off the conveyor while the arms themselves move in an arc.

GEORGE J. MALVICINI.

REFERENCES CITED

The following references are of record in the file of this patent:

UNITED STATES PATENTS

| Number | Name | Date |
| --- | --- | --- |
| 1,479,809 | Headley et al. | Jan. 8, 1924 |
| 1,858,732 | Farnham | May 17, 1932 |